United States Patent [19]
Opoczynski

[11] Patent Number: 5,453,737
[45] Date of Patent: Sep. 26, 1995

[54] CONTROL AND COMMUNICATIONS APPARATUS

[75] Inventor: Adam Opoczynski, Eden Prairie, Minn.

[73] Assignee: ADC Telecommunications, Inc., Minneapolis, Minn.

[21] Appl. No.: 133,462

[22] Filed: Oct. 8, 1993

[51] Int. Cl.$^6$ .............................. H04L 12/50; H04Q 3/00; H04J 3/02; G06F 11/00
[52] U.S. Cl. ................. 340/825.03; 340/825.01; 340/825.52; 370/85.11; 395/182.02
[58] Field of Search ................. 340/825.01, 825.03, 340/825.04, 825.06, 825.52; 370/16, 16.1, 85.11; 371/8.2

[56] References Cited

U.S. PATENT DOCUMENTS

| | | |
|---|---|---|
| 4,245,340 | 1/1981 | Landry . |
| 4,282,493 | 8/1981 | Moreau . |
| 4,290,142 | 9/1981 | Schnee et al. . |
| 4,304,001 | 12/1981 | Cope .................... 340/825.01 |
| 4,395,780 | 7/1983 | Gohm et al. . |
| 4,441,180 | 4/1984 | Schussler . |
| 4,484,218 | 11/1984 | Boland et al. . |
| 4,491,983 | 1/1985 | Pinnow et al. . |
| 4,506,387 | 3/1985 | Walter . |

(List continued on next page.)

FOREIGN PATENT DOCUMENTS

| | | |
|---|---|---|
| 1204230 | 5/1986 | Canada . |
| 2002295 | 5/1990 | Canada . |
| 0308150A1 | 3/1989 | European Pat. Off. . |
| 0318333A1 | 5/1989 | European Pat. Off. . |
| 0382431A1 | 8/1990 | European Pat. Off. . |
| 88/05233 | 7/1988 | WIPO . |
| 88/09093 | 11/1988 | WIPO . |
| 89/05070 | 6/1989 | WIPO . |
| 90/14734 | 11/1990 | WIPO . |
| 90/14733 | 11/1990 | WIPO . |
| 91/11867 | 8/1991 | WIPO . |
| 92/07432 | 4/1992 | WIPO . |

OTHER PUBLICATIONS

Coherent Multicarrier Tedchniques in Future Broadband Communication Networks. .Baack, E. -J. Bachus, G. Heydt. Design of a Switched Broad-Band Communications Network for Interactive Services.
Economic FO System for New Residential Services. Neal C. Hightower. Telephony Mar. 17, 1986.
The Provision of Telephony Over Passive Optical Networks. C. E. Hoppitt and D. E. A. Clarke, Br. Telecom Technol-vol.. 7, No. 2–Apr. 1989.
Advanced Optical Technologies for the future Local Network. A. M. Hill, J. R. Stem, British Telecom Research Laboratories, IPswich, UK. E–FOC 89. 111–115. Mar. 17, 1986.
Low–cost Digital Passive Optical Networks, A. R. J. Cook, D. W. Faulkner, P. J. Smith, R. A. Lobbett. British Telecom (List continued on next page.)

*Primary Examiner*—Donald J. Yusko
*Assistant Examiner*—Mark H. Rinehart
*Attorney, Agent, or Firm*—Schwegman, Lundberg & Woessner

[57] ABSTRACT

A master/slave communication and control system includes a master controller and a plurality of slave subsystems, the master controller connected with the slave subsystems through first and second independent serial data buses, one of the data buses providing a working data bus, the other data bus providing a standby data bus. The master controller generates a A/B select signal applied to each of the slave subsystems to select which of the A or B data buses the slave .subsystems will use to communicate with the master controller. Each of those slave subsystems generates an independent request for communication signal, carried on an input request line to the master controller. A plurality of kill signals are generated by the master controller and applied over independent kill lines to each of the slave subsystems, whereby the master controller may send the kill signal to any one of the slave subsystems. Each of the slave subsystems can receive its respective kill signal and disconnect itself from the data buses.

1 Claim, 3 Drawing Sheets

U.S. PATENT DOCUMENTS

| | | |
|---|---|---|
| 4,545,048 | 10/1985 | Hauk et al. . |
| 4,574,305 | 3/1986 | Campbell et al. . |
| 4,627,045 | 12/1986 | Olson et al. ............................... 371/8.2 |
| 4,642,806 | 2/1987 | Hewitt et al. . |
| 4,651,330 | 3/1987 | Ballance . |
| 4,669,079 | 5/1987 | Blum ..................... 370/85.11 |
| 4,686,667 | 8/1987 | Ohnsorge . |
| 4,705,350 | 11/1987 | Cheng . |
| 4,725,836 | 2/1988 | Gnidos ............................... 340/825.52 |
| 4,734,764 | 3/1988 | Pocock et al. . |
| 4,847,837 | 7/1989 | Morales et al. .......................... 371/8.2 |
| 4,959,862 | 9/1990 | Davidov et al. . |
| 4,977,593 | 12/1990 | Ballance . |
| 5,056,090 | 10/1991 | Kubota ..................... 371/8.2 |
| 5,063,595 | 11/1991 | Ballance . |
| 5,086,470 | 2/1992 | Ballance . |
| 5,111,497 | 5/1992 | Bliven et al. . |
| 5,136,411 | 8/1992 | Paik et al. . |
| 5,142,532 | 8/1992 | Adams . |
| 5,153,874 | 10/1992 | Kohno ................. 340/825.01 |
| 5,173,899 | 12/1992 | Ballance . |
| 5,200,949 | 4/1993 | Kobayashi ......................... 340/825.01 |
| 5,329,521 | 7/1994 | Walsh et al. ............................ 371/8.2 |
| 5,379,278 | 1/1995 | Safadi ...................... 370/16 |
| 5,400,332 | 3/1995 | Imai ..................... 370/85.11 |

OTHER PUBLICATIONS

Ressearch Laboratories, Martlesham Heath, U.K., 1990, IEEE.

Special Report: Operational Support Systems. OSS: A Must for fiber to the Curb. To become a dpolyable volume product, any FTTC system needs to be automated via an operational support system. Jul. 15, 1990/TE&M.

CONTROL AND COMMUNICATIONS APPARATUS

TECHNICAL FIELD OF THE INVENTION

The present invention pertains generally to telecommunications, and more particularly to a system for interconnecting a master controller and slave subsystems in telecommunications equipment.

BACKGROUND OF THE INVENTION

In telecommunications, it is essential that systems are redundant and have protection switching capability. A typical communications system includes standby circuits which may be quickly switched into operation to back up a failing main or working unit.

Telecommunications equipment sometimes includes a plurality of telecommunication subsystems or modules, which communicate with a master controller. To minimize system failures, and consequently system downtime, it is essential that the system for interconnection and communication between the master controller and the slave subsystems be robust, but also capable of high speed, high level communication.

SUMMARY OF THE INVENTION

The present invention provides a system for communication between a master controller and slave subsystems in telecommunications apparatus. The slave subsystems may perform telecommunications functions, such as signal processing or switching, with the master controller communicating with and controlling the operation of the slave subsystems. The system includes two serial communication data buses, one a working bus, the other a standby bus for communications between the master and the slave subsystems. A dedicated select line runs from the master to each of the slaves and is used to switch the slaves between the two data buses. A separate kill line runs between the master subsystem and each slave subsystem, and a separate request (for communication) line runs from each slave subsystem to the master controller. In operation, a slave subsystem may request communication with the master controller, using the request line, thus providing a robust technique for gaining communication with a master controller. High level (and thus error prone) communications between the master and slave subsystems are carried out over one of the serial data buses, with the other one held in standby. The master controller includes fault detection and/or functionality (which may be performed by software) which, by monitoring the operation of the slave subsystems or other elements of the system, may determine that the working data bus is inoperative and thereby cause each of the slave subsystems to switch to the standby data bus for further communications. In the event the controller determines that a slave subsystem is interfering with either or both buses, or is otherwise improperly functioning, the kill line for the associated slave is used to signal the slave to cease operation and disconnect itself from the system.

Thus, the system as described above provides for fast and efficient high level communication over the serial data bus, for a robust hot standby data bus back-up, and for a robust disabling of a slave subsystem and robust signaling by a slave subsystem to a master controller with communication requests.

DETAILED DESCRIPTION OF THE INVENTION

In the following detailed description of the preferred embodiment, reference is made to the accompanying drawings which form a part hereof and in which is shown by way of illustration an exemplary embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Figure 1:
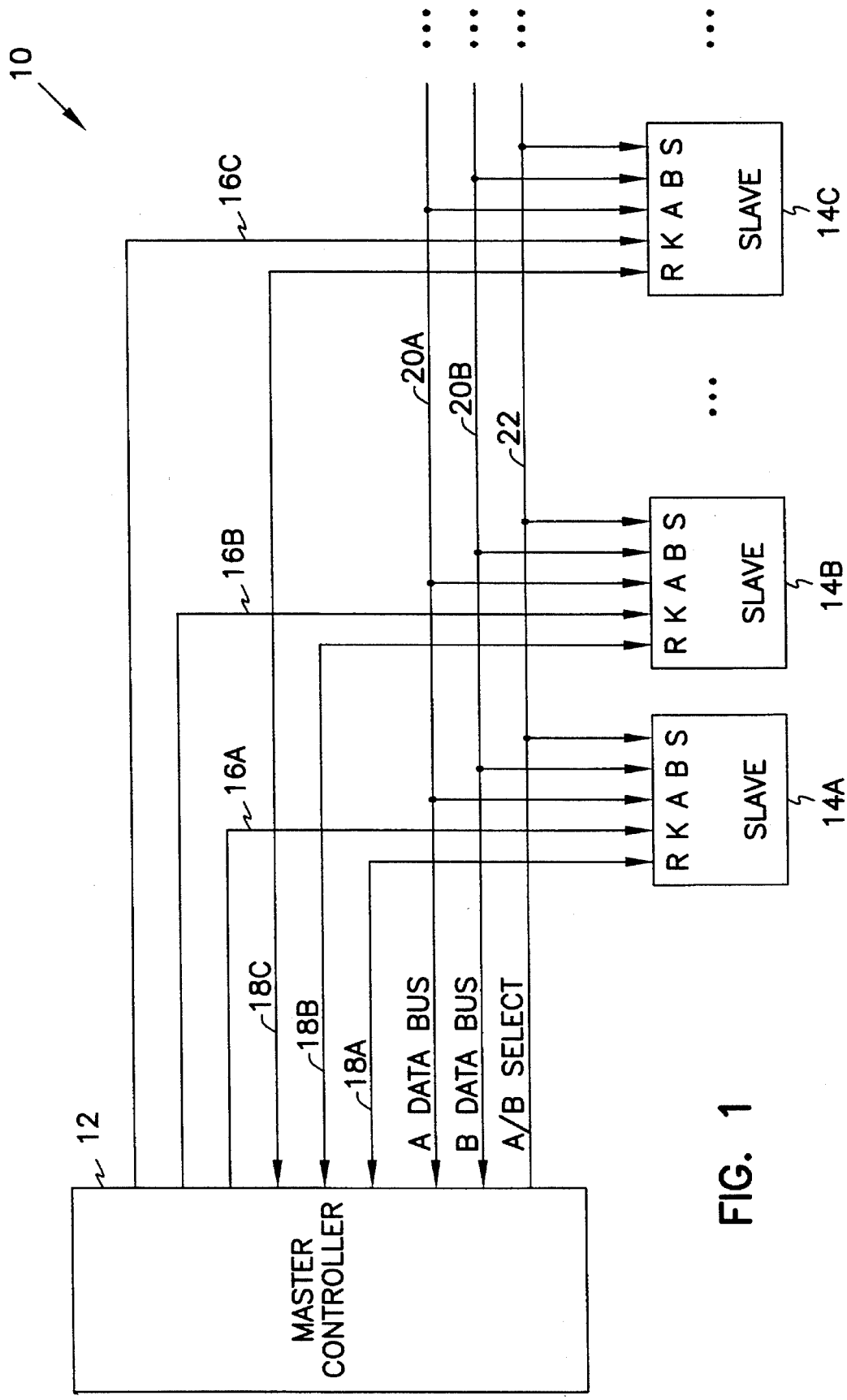
FIG. 1 is a simplified block diagram showing the overall configuration of the system of the present invention.

Referring now to FIG. 1, the present invention comprises a master controller 12 communicating with a plurality of slave subsystems 14A, 14B and 14C, hereinafter generally or collectively referred to as slave subsystems 14. Kill lines 16A, 16B and 16C (generally and collectively referred to as kill line 16) are provided for each of the slave subsystems 14A, 14B and 14C, respectively. Kill lines 16 each comprise an individual, dedicated connection between the master controller 12 and the associated slave subsystem 14.

Request lines 18A, 18B and 18C (generally and collectively referred to as request lines 18) connect slave subsystems 14A, 14B and 14C respectively to the master controller 12. Request lines 18 are each individual dedicated connections between the master controller 12 and the slave subsystems 14.

Data buses 20A and 20B are each independent serial data buses, which are connected between the master controller 12 and the slave subsystem 14. Each slave subsystem 14 has an independent connection to each of the data buses. A select line 22 from the master controller 12 connects to each of the slave subsystems 14 and is a dedicated hard wired connection which can be used by the master controller to signal the slave subsystems as to which data bus to select for purposes of serial data communication with the master controller. The term "dedicated connection," as used herein, means that the connection referred to is preferably physical (for instance, hard wired), as opposed to a connection "carried" in a higher level protocol signal. The main requirement is that the dedicated line is robust and highly fault resistant.

In operation, one of the data buses operates as a working data bus, the other is a standby data bus. In the event that a fault condition is detected on one of the data buses by the master controller 12, the select line 22 may be used by the master controller to signal each of the slaves 14 to switch operation to the standby data bus. If a slave subsystem seeks to send a communication to the master controller, it uses its request line 18 to signal the master controller that it wishes to communicate with the master controller. The master controller unit 12 can acknowledge the request on the working data bus and signal the slave subsystem to send its communication to the master controller 12. Therefore, there is independence between the data bus and the request line, allowing a higher level of robustness than would be achievable if the slave unit communicated only through the serial data bus. For example, if a request for communication is received from a slave subsystem over request line 18, but the slave subsystem fails to respond to a command sent to the slave subsystem over the data bus, by communication back over the data bus, the master controller may conclude, based on this fault and possibly the condition of other faults in the system, that the slave subsystem is defective, or possibly that the data bus is inoperative. In the event that a slave subsystem failure is detected, the master controller 12 may "kill" that slave unit with the associated kill line. The kill line can be hard wired into the associated slave subsystem, and provides for the disabling of the slave subsystem and its removal from the data bus and other system circuits, either through cutting power to the selected circuits in the unit, or through switching the circuits in the subsystem out of communication with the data bus.

Figure 2:
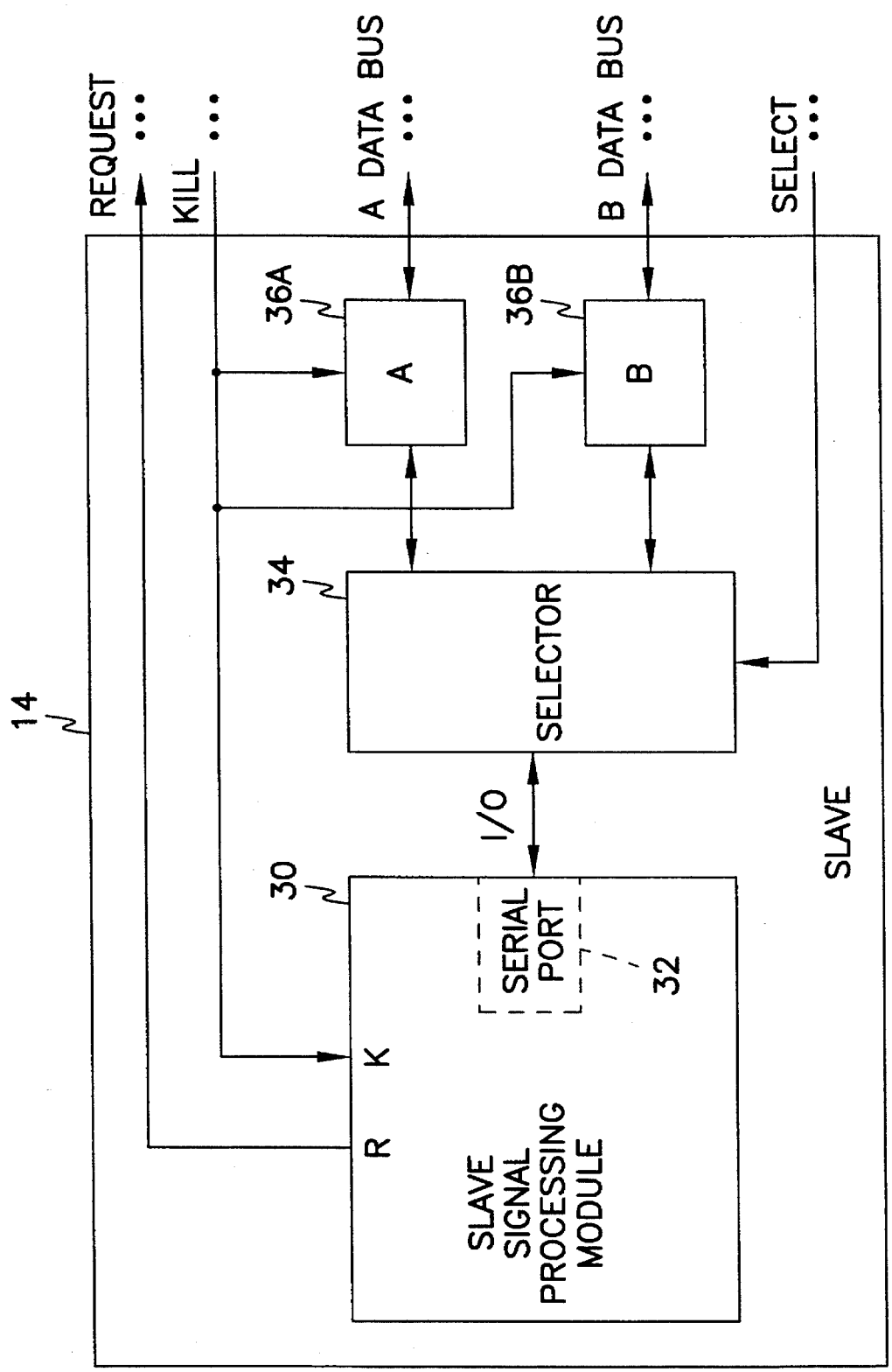
FIG. 2 is a simplified block diagram of a slave subsystem according to the present invention.

Referring now to FIG. 2, there is shown a simplified block diagram of one of the slave subsystems 14. The subsystem includes a slave signal processing module 30, which may comprise signal processing circuits or a microprocessor program to perform signal processing on telecommunications signals, or may comprise switching apparatus, or other telecommunication functionality. The slave signal processing module has a request line output "R" and a kill line input "K." Module 30 further includes a serial port 32. Serial port 32 is connected through a selector circuit 34, which may connect the serial port to either one of driver/receiver circuits 36A or 36B. Circuits 36A and 36B each include a line driver for driving a line of the serial data bus, and a receiver for receiving input from the serial data bus. Each of serial data buses A and B may be two-wire, full-duplex buses, for example, however, the form of the serial data bus is not important to the invention. Selector circuit 34 is under the control of the select line from the master controller unit 12 in order to connect the serial port of slave signal processing module 30 to either circuit 36A or 36B. Module 30, selector 34 and circuits 36A and 36B all receive an input from the kill line for the slave subsystem controlled by the master controller unit 12. When activated, the kill line preferably disables the slave signal processing module 30, the selector 34 and the circuits 36A and 36B, so that the slave subsystem is effectively electrically isolated and decoupled from the data buses A and B. The specific architecture or implementation of the kill feature or kill line of the present invention, however, is not critical. For example, the kill signal could control a switch positioned between circuits 36A and 36B and the buses A and B or could control the power to the circuits in the unit with at least the circuits 36A and 36B designed to enter a high impedance state when power is removed. Thus, the slave subsystem may signal the master processor unit 12 using the request line, be "killed" with the kill line from the master processor unit 12, and be switched from the A data bus to the B data bus on the application of the select signal from the master controller 12.

Figure 3:
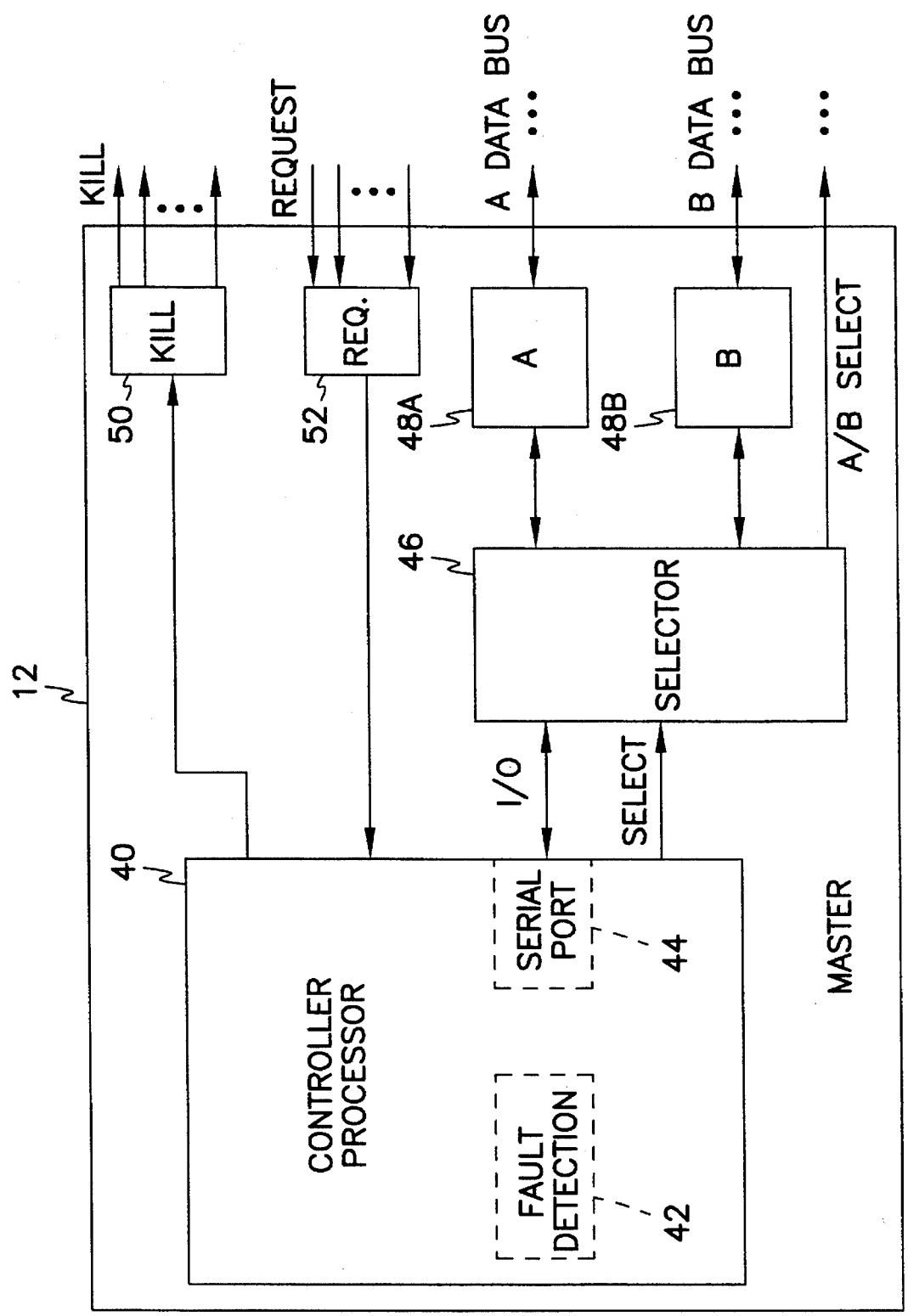
FIG. 3 is a simplified block diagram of a master controller according to the present invention.

Referring now to FIG. 3, there is shown in more detail a simplified block diagram of the master controller 12. Controller 12 includes a controller processor 40, which includes fault detection circuitry software 42 and a serial port 44. Controller processor 40 may comprise controller circuitry and/or a software-driven microprocessor for controlling the operation and/or monitoring the operation of the slave subsystems 14. Serial port 44 is connected through a selector 46, which receives a select line from the controller processor, and controls which of line drivers/receivers circuits 48A or 48B receive the serial port I/O stream. Once selector 46 is switched to communicate with line driver/receiver circuit 48A, the signal on the A/B select line 22 is set to enable communication through the A receiver/driver circuits 36A of the slave subsystems 14. Otherwise, the signal on the A/B select line is set to enable communication in the slave subsystems through driver circuits 36B. Thus, selector 46 both switches the I/O path from the serial port 44 to the selected ones of circuits 48A and 48B and, in addition, generates the A/B select line signal as required to control the slave subsystems selector circuits 34. Exactly how the select signal is generated, however, is not important to the invention. A kill circuit 50 and a request circuit 52 are provided in master controller unit 12. Kill circuit 50 is controlled by controller processor 40, to generate a signal on each of the kill lines 16, in accordance with the operating principles of the invention. Circuit 52 receives request signals from the slave subsystems over the request lines 18, which requests are communicated to the controller processor 40, for example, by polling of the circuit 52 by controller processor 40, or by an interrupt event. However, how the kill signals are generated or the request received by processor 40 is not important to the invention. Fault detection circuitry/software 42 may comprise fault detection circuitry or may comprise fault detection algorithms programmed into a microprocessor. The fault detection algorithms may be sensitive to the response of slave subsystems to queries made by the controller processor to those subsystems and/or be additionally responsive to other fault detection signal inputs, as may be provided from other circuits or subsystems. The particular fault detection mechanism or algorithm used is not, however, critical to the invention.

Thus, as described above, the present invention provides a robust system for communication between a master control unit and a slave subsystem in telecommunications equipment requiring a high degree of dependability and fast protection switching, in the event of equipment failure.

I claim:

1. A system for communication and control between a master controller and a plurality of slave subsystems in telecommunications equipment, comprising:

a plurality of slave subsystems, each of the slave subsystems including a request line output connected to a request line, a kill line input connected to a kill line, first and second circuits connected with first and second data buses, one of the first and second data buses being a standby for the other data bus, and a select line input connected to a select line, each slave subsystem further including means for receiving a select signal on the select line input for signaling which data bus to use for communication and for selectively connecting a serial port in the slave subsystem to one of the first and second circuits connecting to the first and second data buses, each slave subsystem further including means for disconnecting the first and second circuits from the first and second data buses in response to a signal received on the kill line input and means for generating a request signal on the request line output, the request signal requesting communication with a master controller; and the master controller including a plurality of kill line outputs connected to a plurality of kill lines, each kill line connected to the kill line input of one of the plurality of slave subsystems, a plurality of request line inputs connected to a plurality of request lines, each request line connected to the request line output of one of the plurality of slave subsystems, means for connecting a serial port of the master controller with a selected one of the first and second data buses, and a select line output connected to the select line, and means for applying a select signal to the select line so that the connection of the plurality of slave subsystems to the first and second data buses is controlled by the master controller, the master controller further including means for generating a plurality of kill signals to be applied to respective kill line outputs to electrically isolate at least one of the slave subsystems from the first and second data buses, and means for receiving request signals from the plurality of slave subsystems on the plurality of request line inputs.

* * * * *